United States Patent
Rowles (10) Patent No.: US 8,845,249 B2
(45) Date of Patent: Sep. 30, 2014

(54) QUICK RELEASE DEVICE

(71) Applicant: Ancra International LLC, Azusa, CA (US)

(72) Inventor: John F. Rowles, Fullerton, CA (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 14/150,202

(22) Filed: Jan. 8, 2014

(65) Prior Publication Data

US 2014/0199131 A1 Jul. 17, 2014

Related U.S. Application Data

(60) Provisional application No. 61/752,173, filed on Jan. 14, 2013.

(51) Int. Cl.
*B60P 7/08* (2006.01)

(52) U.S. Cl.
CPC .................................... *B60P 7/0815* (2013.01)
USPC ............................................. 410/80; 410/105

(58) Field of Classification Search
USPC ........... 410/77, 80, 104, 105, 106; 244/118.1; 248/503
See application file for complete search history.

(56) References Cited

U.S. PATENT DOCUMENTS

| | | |
|---|---|---|
| 3,906,870 A | 9/1975 | Alberti |
| 4,062,298 A | 12/1977 | Weik |
| 4,230,432 A | 10/1980 | Howell |
| 4,493,470 A | 1/1985 | Engel |
| 4,530,483 A | 7/1985 | Nordstrom |
| 4,708,549 A | 11/1987 | Jensen |
| 5,607,251 A | 3/1997 | Rafn |
| 5,871,318 A | 2/1999 | Dixon et al. |
| 6,789,988 B1 | 9/2004 | Moradians |
| 6,817,578 B1 | 11/2004 | Garcia et al. |
| 6,846,140 B2 | 1/2005 | Anderson et al. |
| 7,029,215 B2 | 4/2006 | Dowty |
| 7,976,256 B2 | 7/2011 | Womack et al. |
| 8,118,524 B2 * | 2/2012 | Schulze et al. .................. 410/69 |

FOREIGN PATENT DOCUMENTS

EP 1 607 329 A1 12/2005

* cited by examiner

*Primary Examiner* — Stephen Gordon
(74) *Attorney, Agent, or Firm* — Brinks Gilson & Lione (57) ABSTRACT

A toolless quick release device for attaching cargo handling system equipment to floor fittings is provided. The quick release device includes a stud, outer retainer, and inner retainer. The stud includes a locking head portion configured to be received in a slotted track. The neck portion of the stud and a center portion of the inner retainer are disposed within a center hole of the outer retainer. The hole of the outer retainer includes a blind hole that receives a ball. The ball may engage one or more recesses in the inner retainer and rotatably fixes the outer portion with respect to the inner portion of the stud. The outer portion further includes an arcuate track that receives a tab from the inner retainer, with the arc length of the track defining the possible relative rotation of the inner retainer and stud with respect to the outer retainer.

15 Claims, 16 Drawing Sheets

QUICK RELEASE DEVICE

RELATED APPLICATIONS

This claims priority to U.S. Provisional Patent Application Ser. No. 61/752,173 filed on Jan. 14, 2013, the entirety of which is hereby incorporated by reference herein.

TECHNICAL FIELD

This disclosure relates to cargo handling system equipment used in a vehicle, such as those used in an aircraft and, more particularly, to a quick release device used to attach cargo handling system equipment on floor fittings and/or seat tracks for rapid removal and installation or re-arrangement of the cargo handling system equipment.

BRIEF SUMMARY

This disclosure relates to a quick release device for use in cargo handling system equipment.

It is accordingly an object of the present disclosure to provide a cargo handling system that is easy and quick to install and remove within a vehicle.

It is an object of the present disclosure to provide a quick release device that gives a visible indication when it has been safely locked to a floor fitting and/or seat track in a vehicle.

It is an object of the present disclosure to provide a quick release device that permits cargo handling system equipment to be readily moved without the necessity of tools.

A representative embodiment of the disclosure is provided. The embodiment includes a toolless quick release device designed to attach cargo equipment base to a slotted track. The quick release device includes a stud, an inner retainer, and outer retainer. The stud includes a locking head portion configured to be received below a lug segment of a slotted track, and a neck portion which includes a plurality of flats that engage corresponding flats on a central portion of the inner retainer. The neck portion of the stud and the center portion of the inner retainer are disposed within the center hole of the outer retainer. The outer retainer includes a blind hole that receives a ball that is biased radially inward toward the center hole. The ball may be received in one of a plurality of recesses defined upon the central portion of the inner retainer, with engagement of the ball and a recess rotatably fits in the outer retainer with respect to the stud. The outer retainer further includes an arcuate track that receives a tab of the inner retainer, with an arc length of the track defining the possible relative rotation of the inner retainer and stud with respect to the outer retainer.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 3 is a perspective view of the outer retainer of a quick release device of FIG. 2a.

FIG. 6 is a perspective view of the inner retainer of the quick release device of FIG. 2a.

DETAILED DESCRIPTION OF THE DRAWINGS AND THE PRESENTLY PREFERRED EMBODIMENTS

Figure 1:
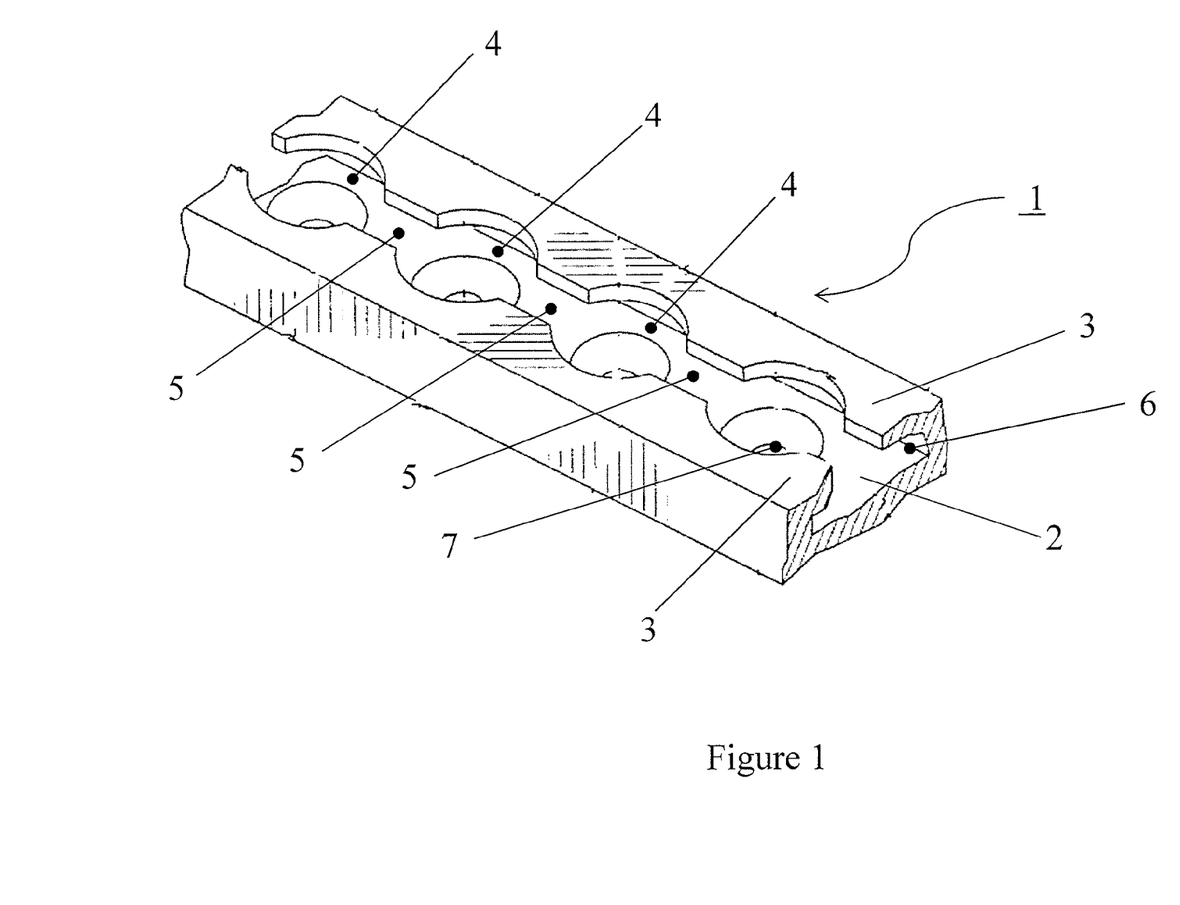
FIG. 1 is a side elevation of a slotted track.

Referring now to FIG. 1, floor fittings (such as a conventional aviation slotted track 1) have a longitudinally-extending slot channel 2 therein which extends along the entire length of the slotted track 1. Opposed upper walls 3 of the slotted track 1 have regularly spaced-apart enlarged openings (a "node segment") 4 along the length thereof, separated by relatively narrower track slot segments (a "lug segment") 5 which form the portions of the structure which actually perform the locking function. The upper walls 3 in the lug segment 5 extend into the slot channel 2 to provide undercut areas in the slot openings 6. The upper walls 3 in the node segment 4 are very narrow and have little or no undercut areas in the slot channel 2. The slotted track 1 is attached to a surface of the vehicle by screws (or other connection means) through holes 7 in the bottom of slotted track 1.

Figure 2A:
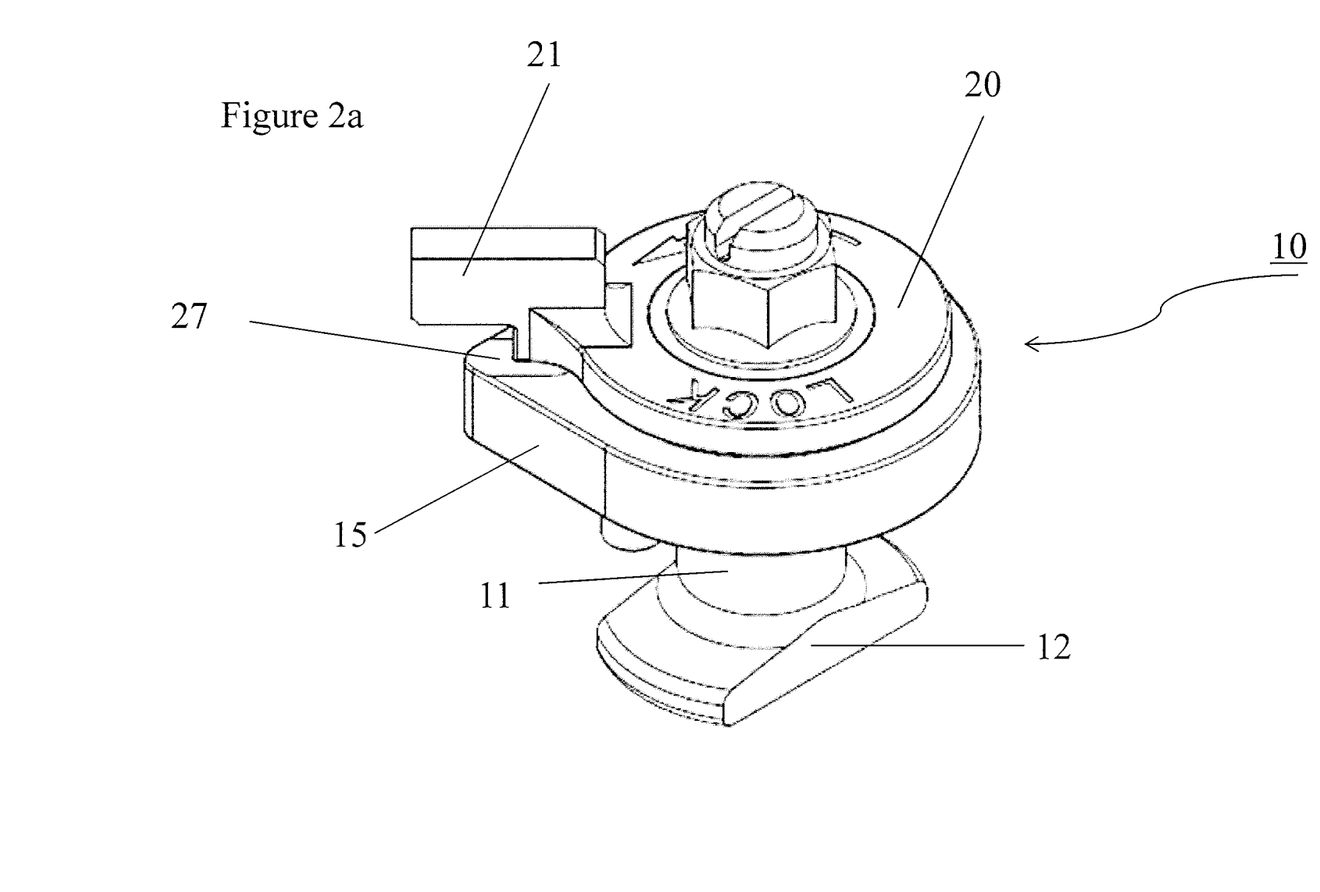
FIG. 2a is a perspective view of a quick release device, showing the device in the locking position.
Figure 2B:
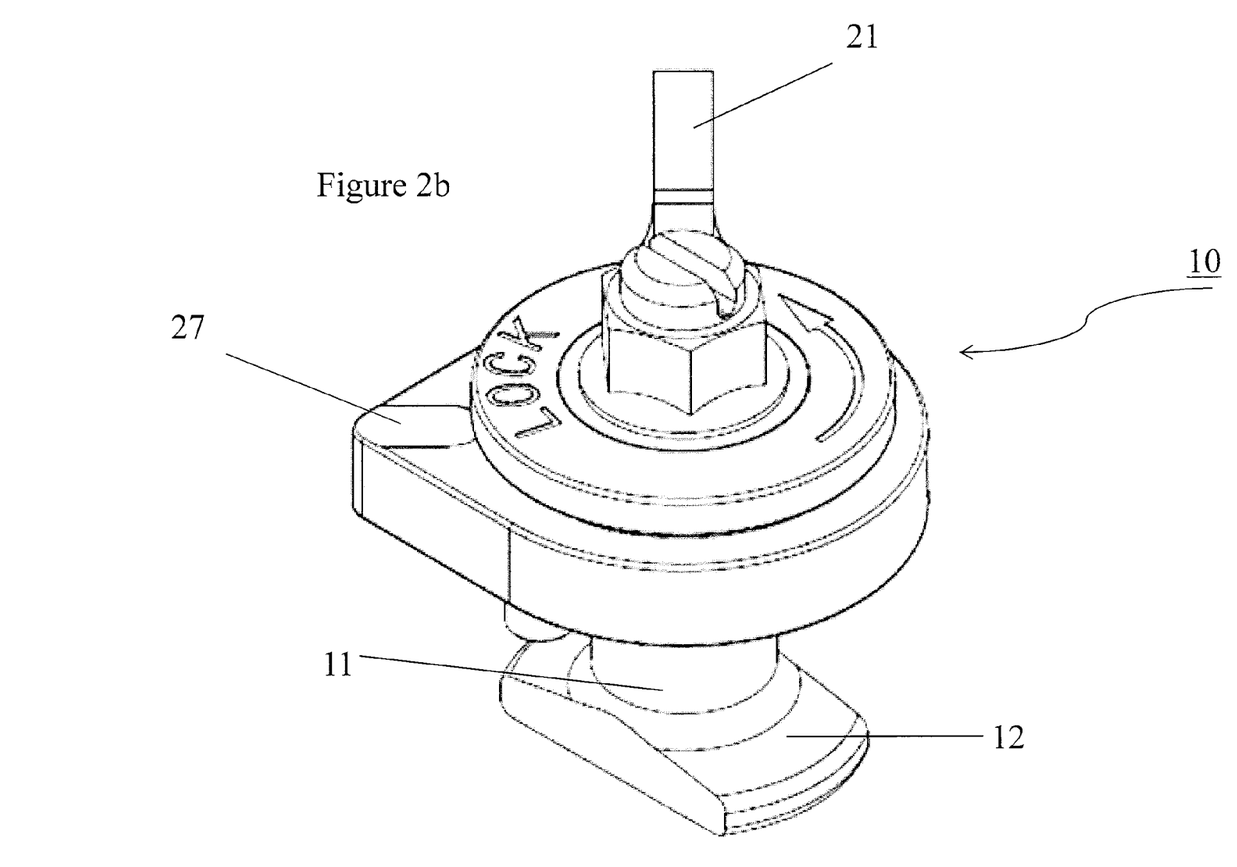
FIG. 2b is the view of FIG. 2a, showing the quick release device in the releasing position.
Figure 2C:
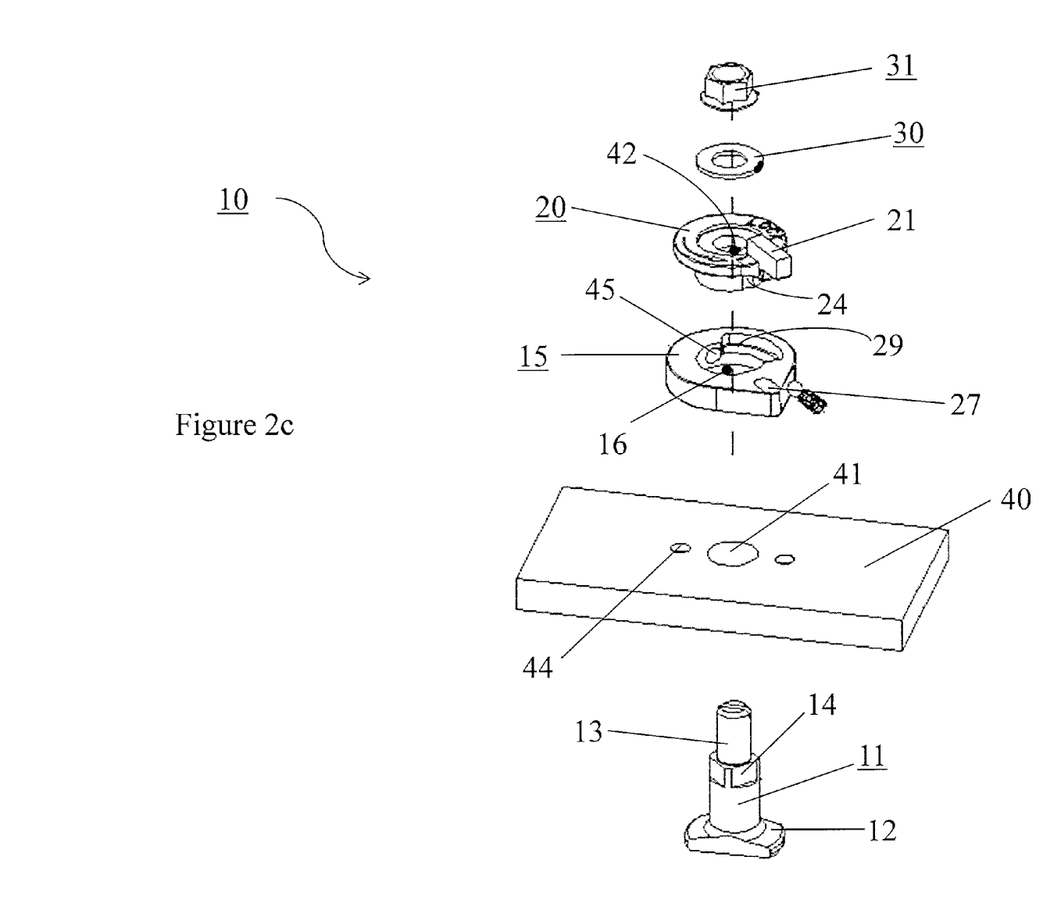
FIG. 2c is an exploded prospective view of a quick release device of the present disclosure.

Referring to FIG. 2c, a quick release device 10 is provided. The quick release device 10 comprises a stud 11, outer retainer 15, inner retainer 20. In one embodiment, the quick release device further comprises a washer 30 and nut 31.

The quick release device 10 fits together as follows. The neck portion 13 of the stud 11 is shaped to pass through a vertical bore 41 in the underside of a conventional or specialized cargo equipment base 40. Next, the neck portion 13 of the stud 11 is shaped to pass through a hole 16 in the center of the outer retainer 15 to allow the outer retainer 15 to rest on top of the cargo equipment base 40. Next, the neck portion 13 of the stud 11 is shaped to passed through a hole 42 in the center of the inner retainer 20 to allow it to rest on top of the outer retainer 15. Next, the neck portion 13 of the stud 11 is shaped to engage a washer 30 and nut 31 that are added on top of the inner retainer 20.

Figure 9:
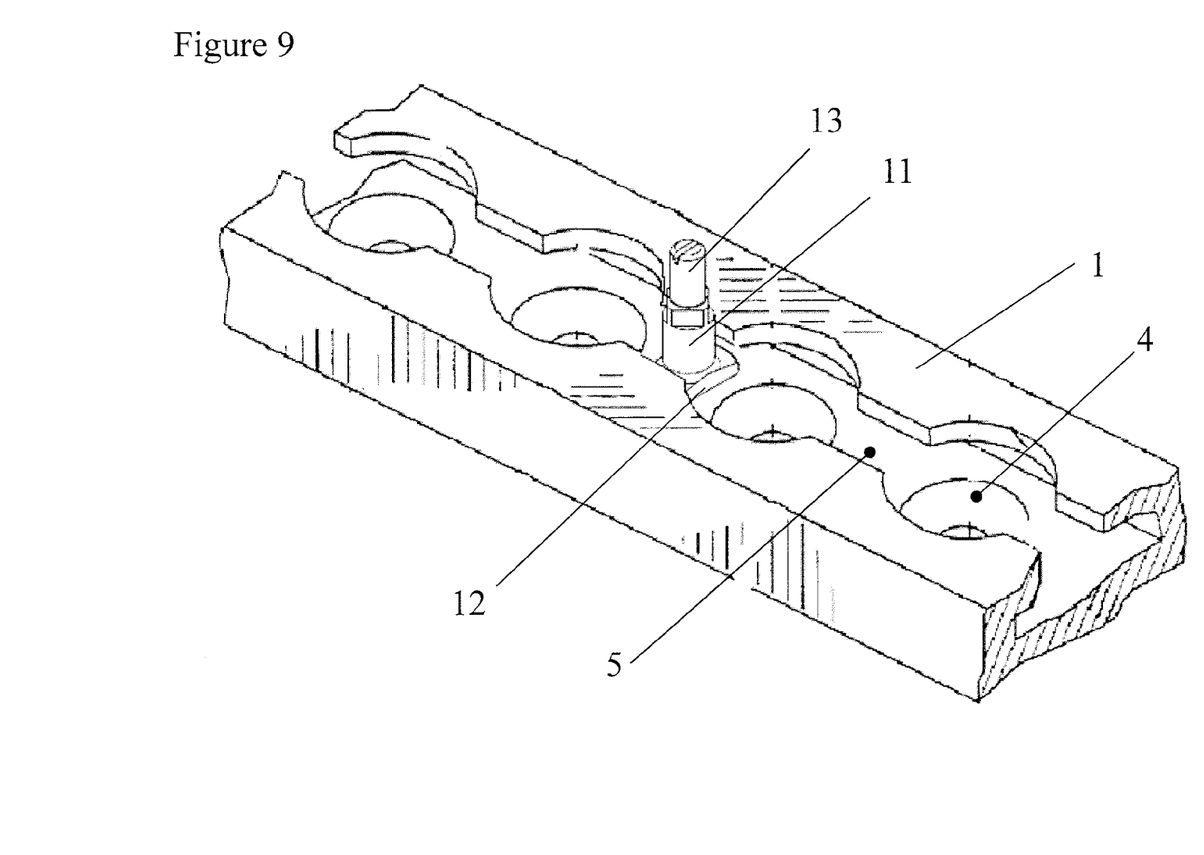
FIG. 9 is a perspective view of the stud of the device of FIG. 2a in the locking position within the track.
Figure 10:
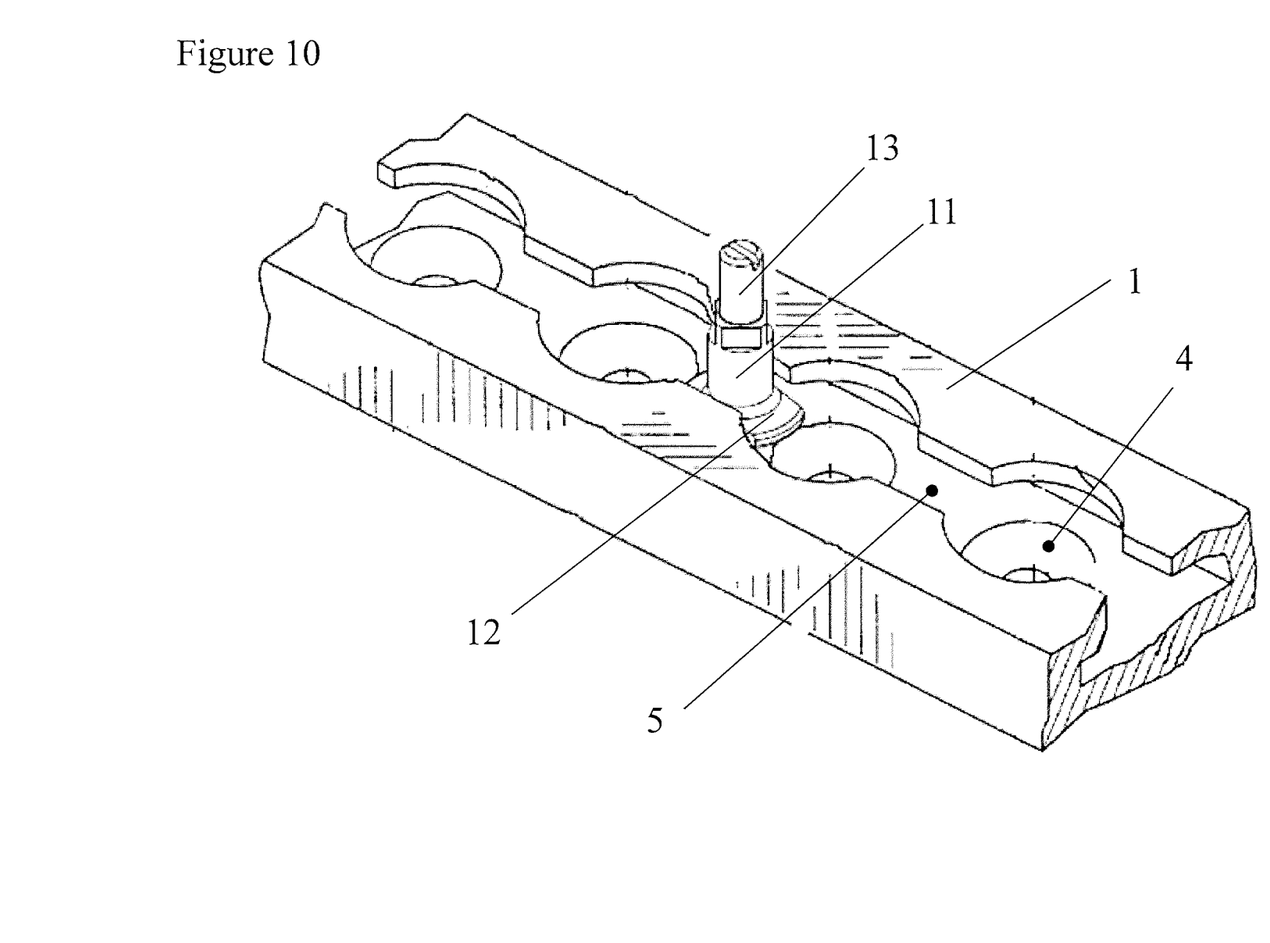
FIG. 10 is the view of FIG. 9 with the stud in the releasing position.
Figure 11:
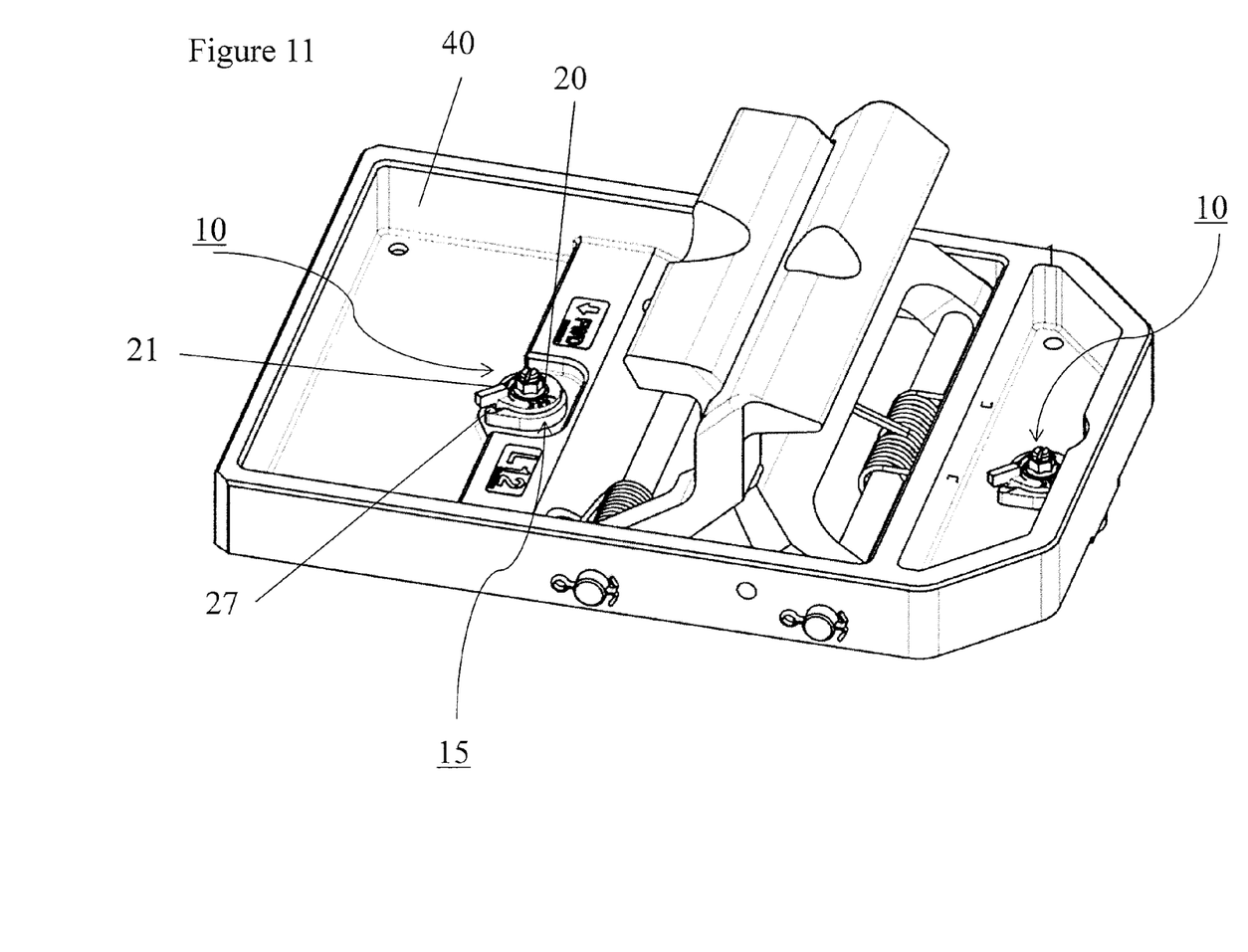
FIG. 11 is a perspective view of a cargo equipment base with multiple quick releases devices of FIG. 2a installed thereon, depicting the quick release devices in the locking position.
Figure 12:
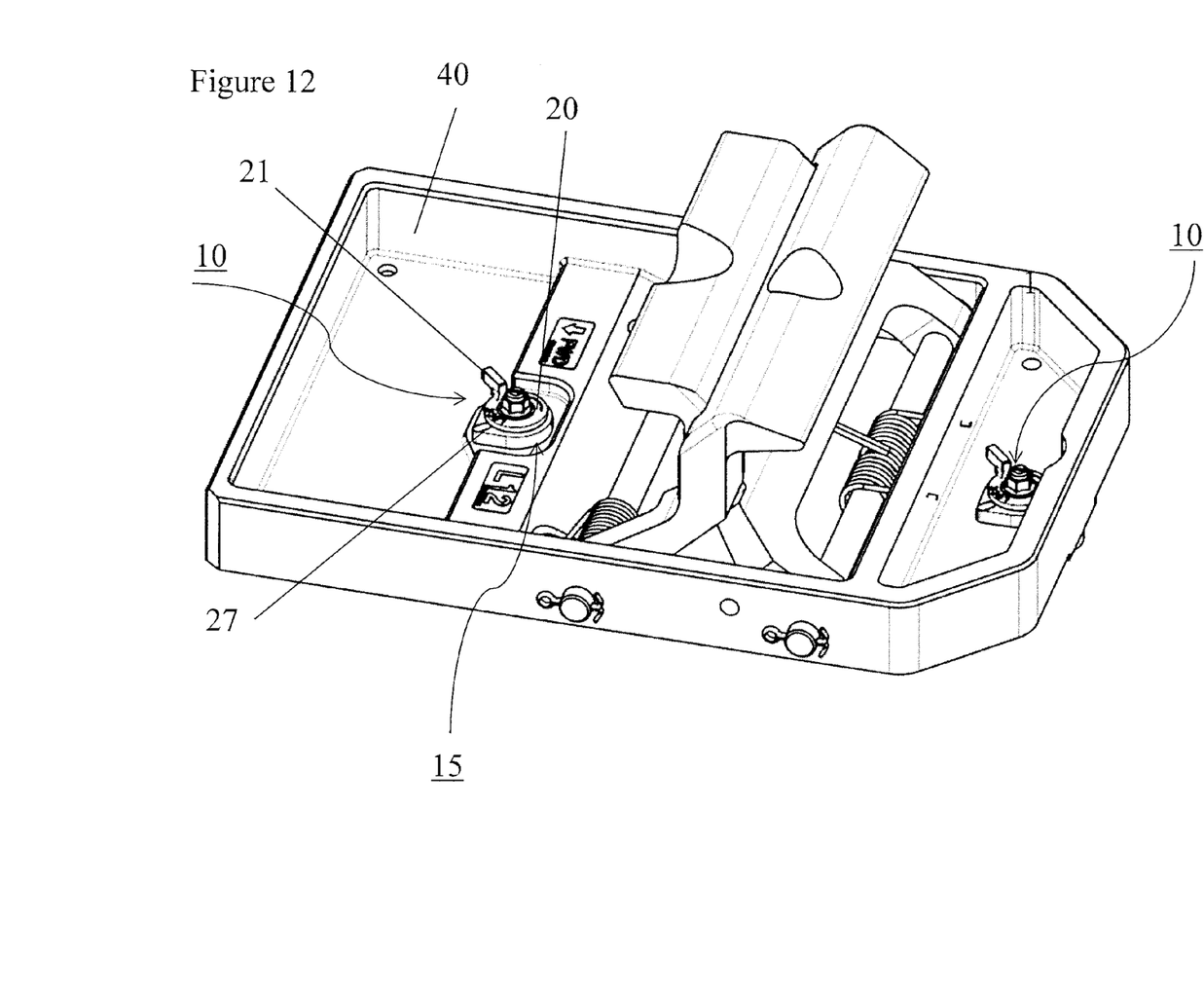
FIG. 12 is the view of FIG. 11 with the quick release devices in the releasing position.

The stud 11 has a locking head portion 12 which is adapted and sized to receive the lug segment 5 of the slotted track 1. In some embodiments, the locking head portion 12 is generally T-shaped. The locking head portion 12 is biased for engagement and configured to be received below the lug segment 5 in the slot channel 2. The stud 11 has a rotatable body that is pivotable between a locking position (FIG. 9) in which said locking head portion 12 can lockingly engage said lug segment 5 whereby said stud 11 restrains relative movement between said cargo equipment base 40 and the slotted track 1 and a releasing position (FIG. 10) in which said locking head portion 12 is out of locking engagement with said lug segment 5 whereby said stud 11 no longer restrains relative movement between said cargo equipment base 40 and the slotted track 1.

In one embodiment the stud 11 has a neck portion 13 with one or more flats 14 disposed thereon that engage corresponding one or more flats on a central portion 22 of the inner retainer 20.

The outer retainer 15 has a center hole 16 for receiving the neck portion 13 of the stud 11 and the shroud portion 30 of the inner retainer 20. The outer retainer 15 has a detent 17 that is biased radially inward toward the shroud portion 30 of the inner retainer 20 (when the unit is assembled) by a biasing member, such as a spring 18. In some embodiments, the detent 17 may be a ball such as a ball bearing. A blind hole 19 is defined through an inner surface 28 of the outer retainer 15. The blind hole 19 receives the detent 17 that is biased radially inward toward the center hole 16. A second hole 45 may be formed to allow the tools needed.

The inner retainer 20 (discussed below) may have a plurality of recesses 24 disposed upon the shroud portion 30 for selective interaction with the detent 17, which is biased radially inward by a spring 18. The outer retainer 15 also has an arcuate track 29 that is defined upon an upper surface 26 of the outer retainer 15 and bordering the center hole 16. The arcuate track 29 receives a tab 32 (discussed below) that extends radially outward from a shroud portion 30 of the inner retainer 20. The arc length of the track 29 defines the possible relative rotation of the inner retainer 20 and stud 11 with respect to the outer retainer 15. In some embodiments, the arcuate track 29 may be between about 45 to about 135 degrees in arc length, inclusive of all arc lengths therewithin. In other embodiments, the arcuate track 29 may be about 90 degrees which allows the two positions of locking head portion 12 of the stud 11 to be perpendicular to each other in the locking position and the releasing position.

Figure 3:
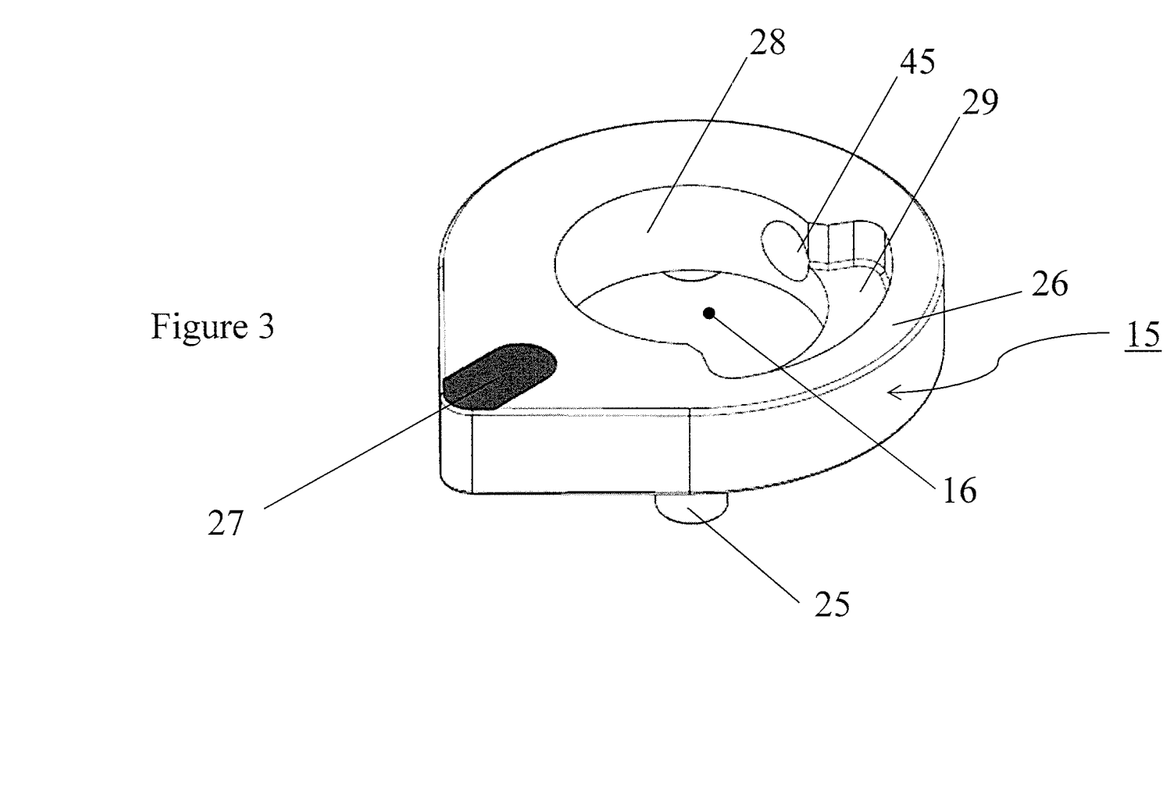
Figure 4:
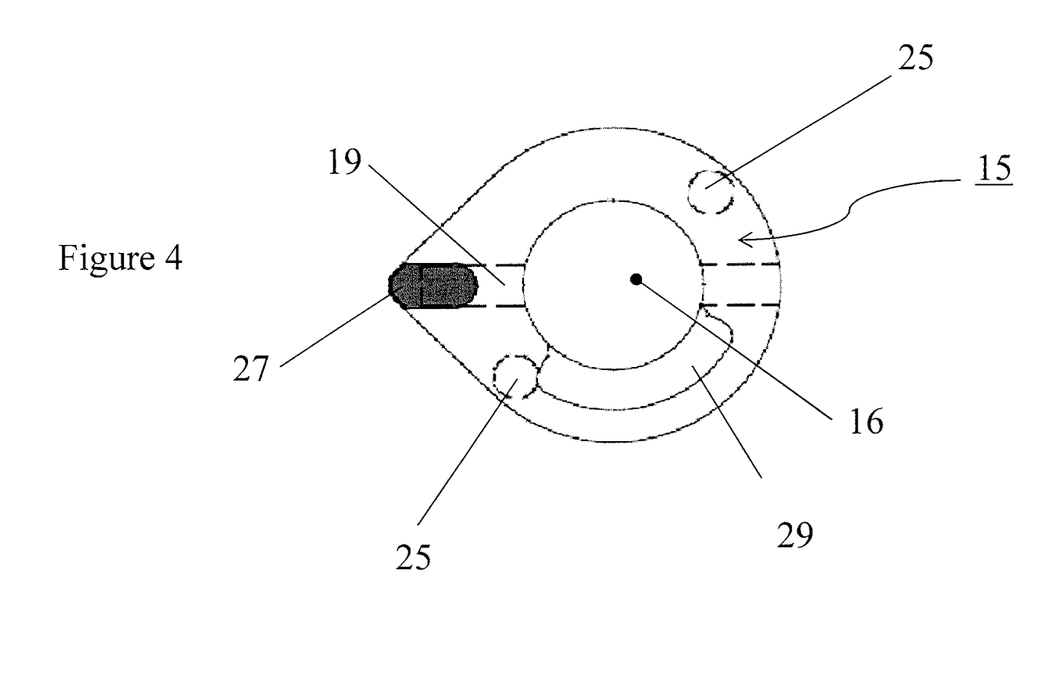
FIG. 4 is a top elevation view of the outer retainer FIG. 3.
Figure 5:
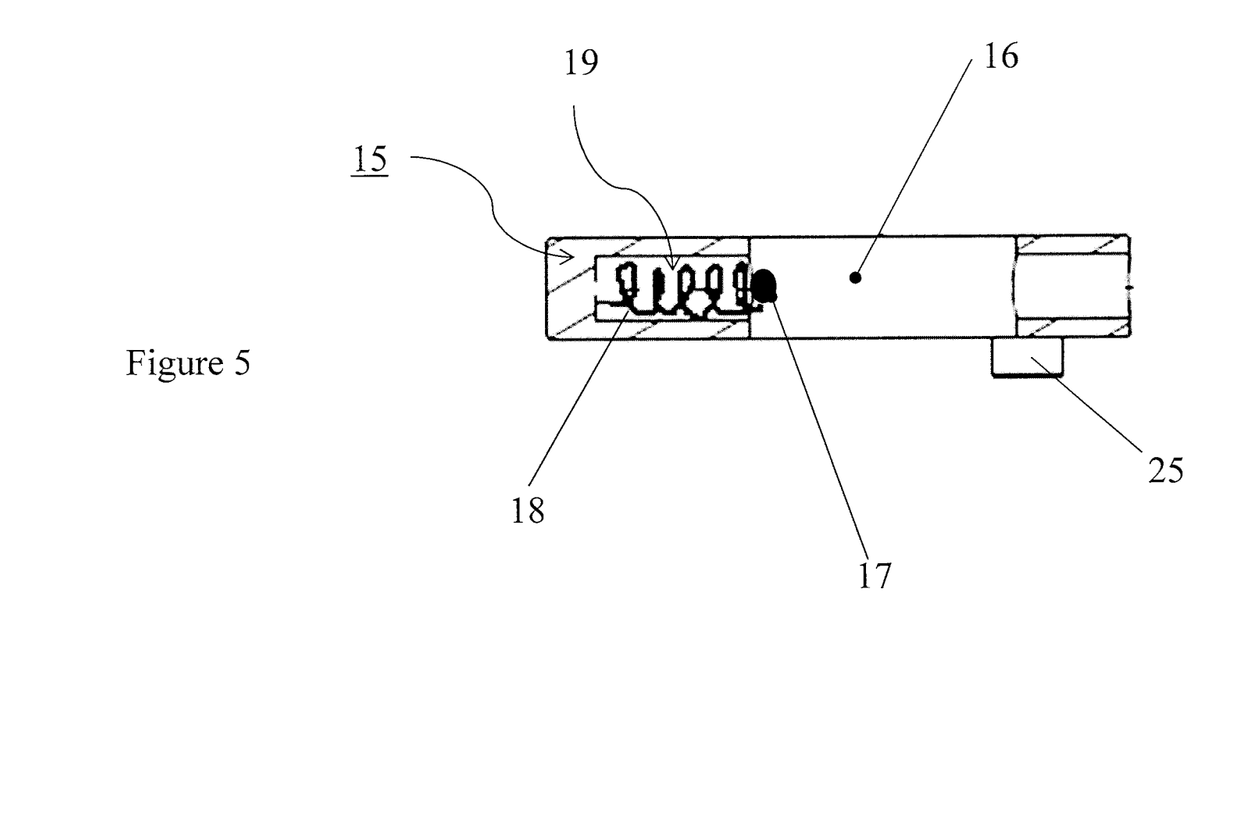
FIG. 5 is a cross-sectional view of the outer retainer of FIG. 3.
Figure 6:
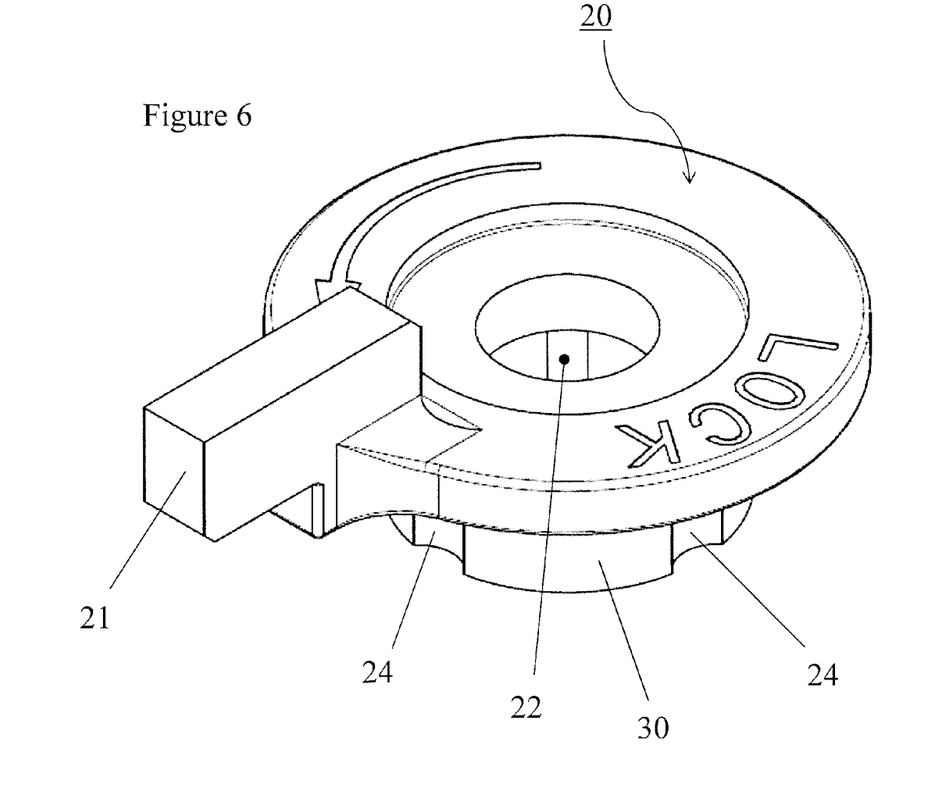
Figure 7:
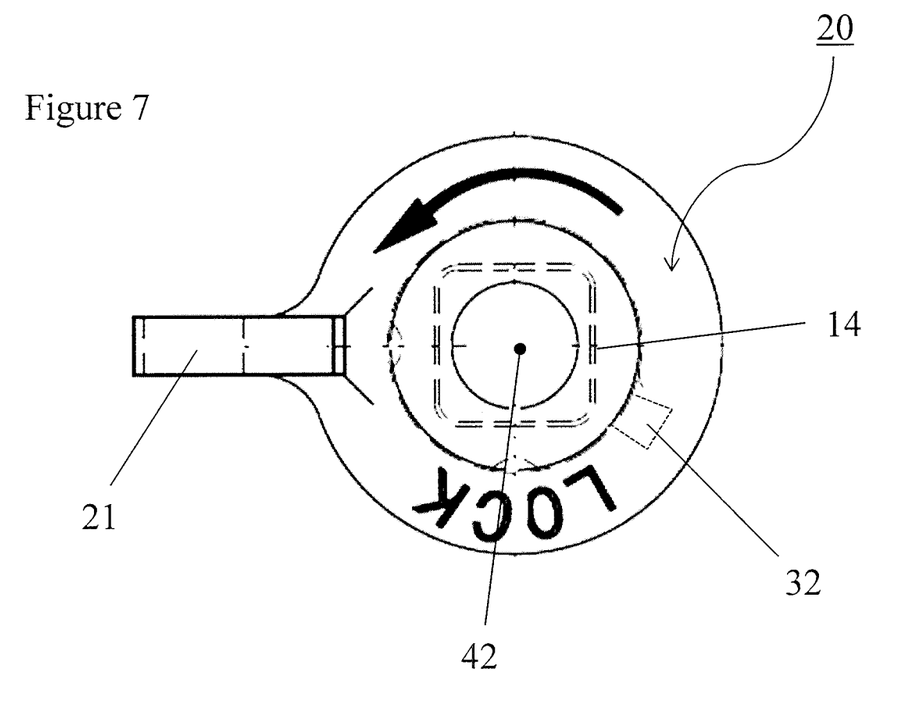
FIG. 7 is a top elevation view of the inner retainer of FIG. 6.
Figure 8:
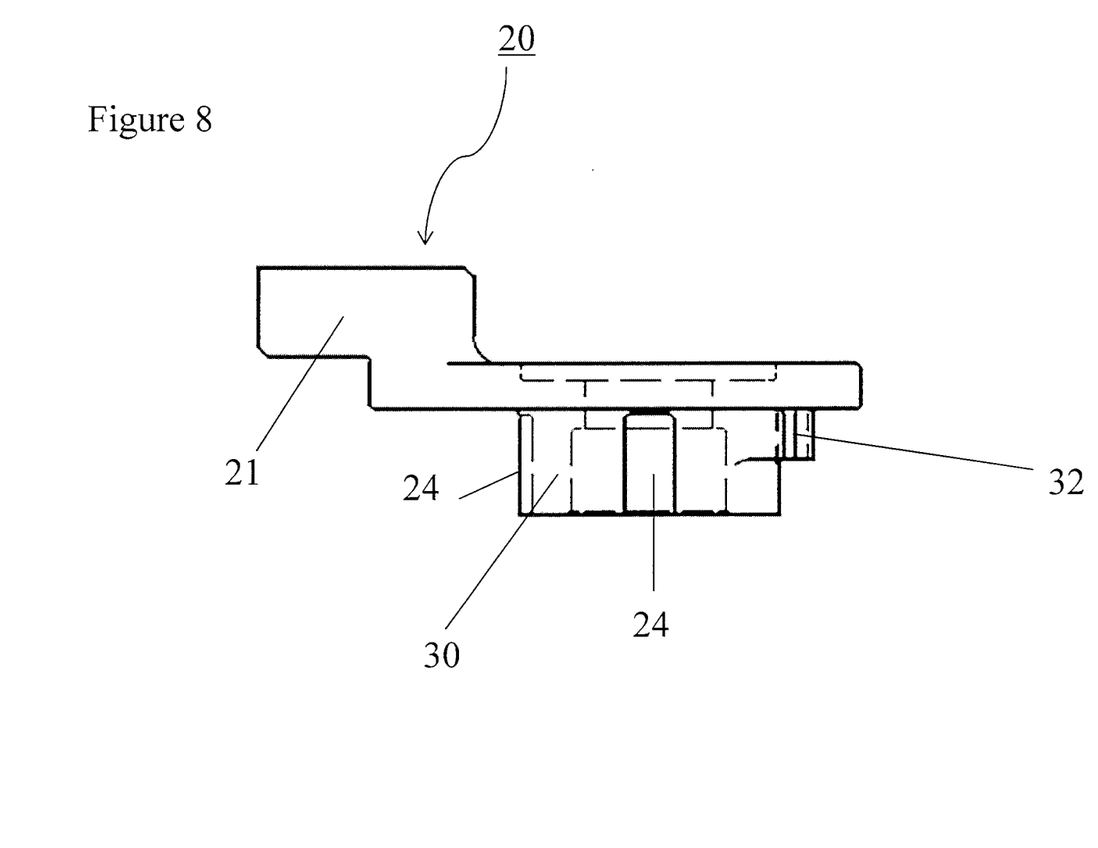
FIG. 8 is a side view of the inner retainer of FIG. 6.

The outer retainer 15 may be fixed to the cargo equipment base 40 with one or more feet 25 (FIG. 3) that are received within similar pass-through holes 44 on the cargo equipment base 40, and therefore is fixed stationary in both the locked and unlocked positions.

The inner retainer 20 has a center hole for receiving the neck portion 13 of the stud 11. The center hole extends through the shroud portion 30. The inner retainer 20 has a tab 32 which engages the arcuate track 29 in the outer retainer 15. When a user rotates (or disengages) an operator 21 disposed upon an upper surface of the inner retainer 20, the stud 11 is rotated in tandem so that the locking head portion 12 engages the lug segment 5 (the locked position). In some embodiments, the inner retainer 20 and stud 11 may be rotated with respect to the outer retainer 15 along an arc length that is defined by the arc length of the arcuate track 29. Specifically, in some embodiments, the arc length of the arcuate track 29 may be sized to allow for sufficient rotation of the inner retainer 20 and the stud 11 to allow the locking head portion 12 of the stud 11 to transfer from mutually perpendicular locking and releasing positions. In one embodiment, a user can rotate the operator 21 without the use of tools.

The shroud portion 30 of the inner retainer 20 may have a plurality of recesses 24 defined thereon for selective receipt of a detent 17 biasingly received within the outer retainer 15. The plurality of recesses 24 may be two recesses that are spaced apart upon the outer surface of the shroud portion 30 such that the detent 17 is disposed within one of the recesses 24 when the tab 32 engages one of the ends of the arcuate track 29, which corresponds to one of the positions of the locking portion of the stud 11. For example, when the inner retainer 20 and stud 11 are positioned such that the locking head portion 12 of the stud 11 is in the releasing position (i.e. oriented in parallel to the slot channel 2 of the track 1, to allow the stud 11 to be inserted into or removed from the track 1) the detent 17 mates with one of the recesses 24 upon the inner retainer 20 and the tab 32 engages one end of the arcuate track 29. Similarly, when the inner retainer 20 and the stud 11 are rotated in unison such that the stud 11 is in the locking position (i.e. with the locking head portion 12 oriented perpendicular to the slot channel 2 of the track 1, such that the locking head portion 12 is prevented from vertical motion with respect to the track by engagement with the walls of the track defining the lug segment 5) the detent 17 mates with the other one of the recesses 24 upon the inner retainer 20 and the tab 32 engages the opposite end of the arcuate track 29.

The outer retainer 15 may include a visual locking indicator 27 to provide for convenient visual (or other) indication of whether the quick release device 10 is in the locking position or the unlocked position. The top axial surface of outer retainer 15 may include a bright-colored painted surface, such as red or orange, which is easily visible. In other embodiments, the visual locking indicator 27 may include other visual or tactile or audible features to provide a user with easy and convenient indication that the stud 11 is in the locking position. When the quick release device 10 is in the locking position, the operator 21 will align with the visual locking indicator 27 so that the visual locking indicator 27 is not visible. When the quick release device 10 is not in the locking position, the operator 21 will not be aligned with the visual locking indicator 27 and it offers a clear visual indication that a correction in the attachment of the quick release device 10 must be made.

The stud 11 can be secured by means of a washer 30 and a nut 31 which rotatably fixes the device to the surface of the cargo equipment base 40.

Figure 13:
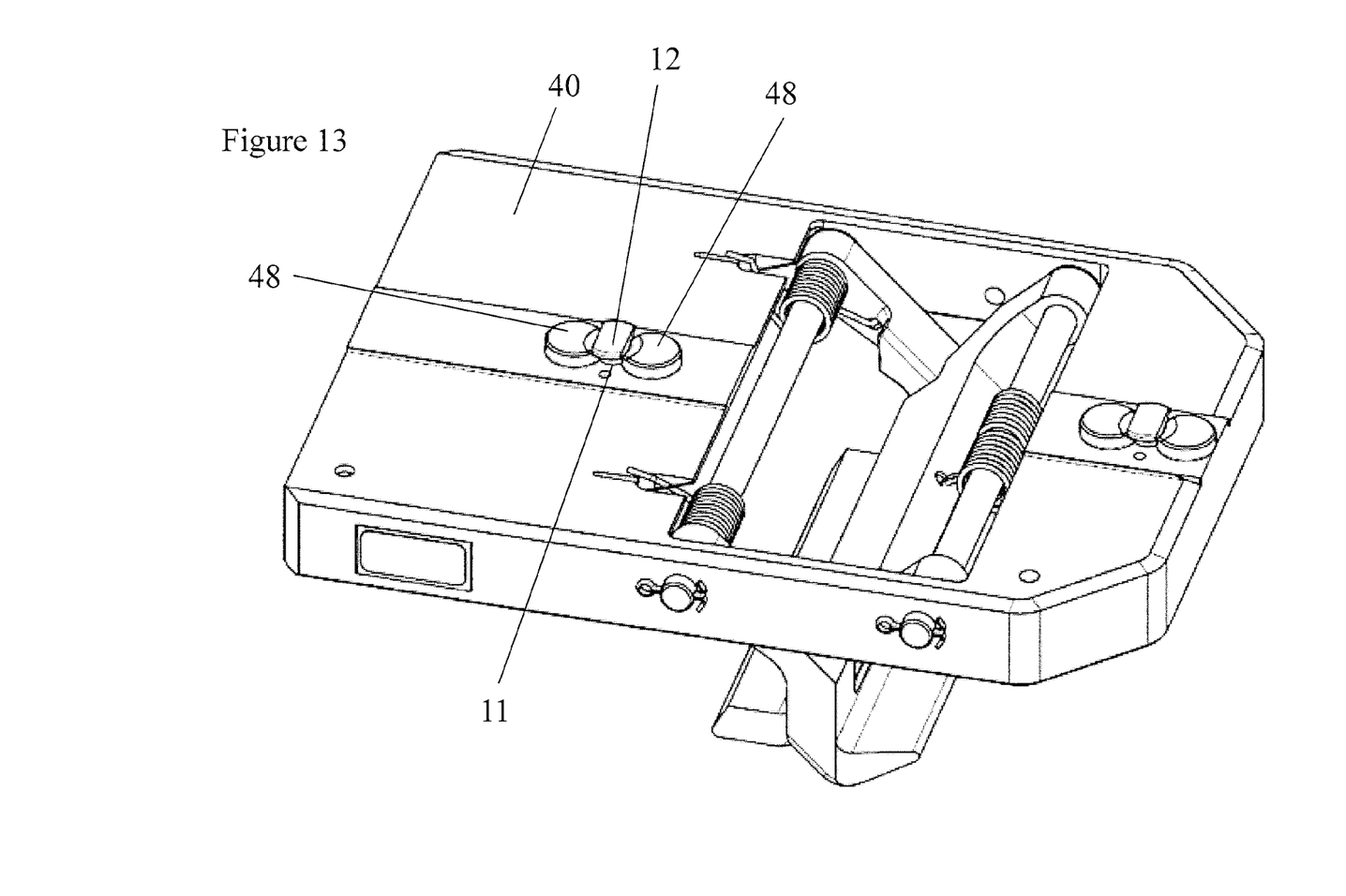
FIG. 13 is a bottom perspective view of the cargo equipment base of FIG. 11 depicting the quick release devices in the locking position.
Figure 14:
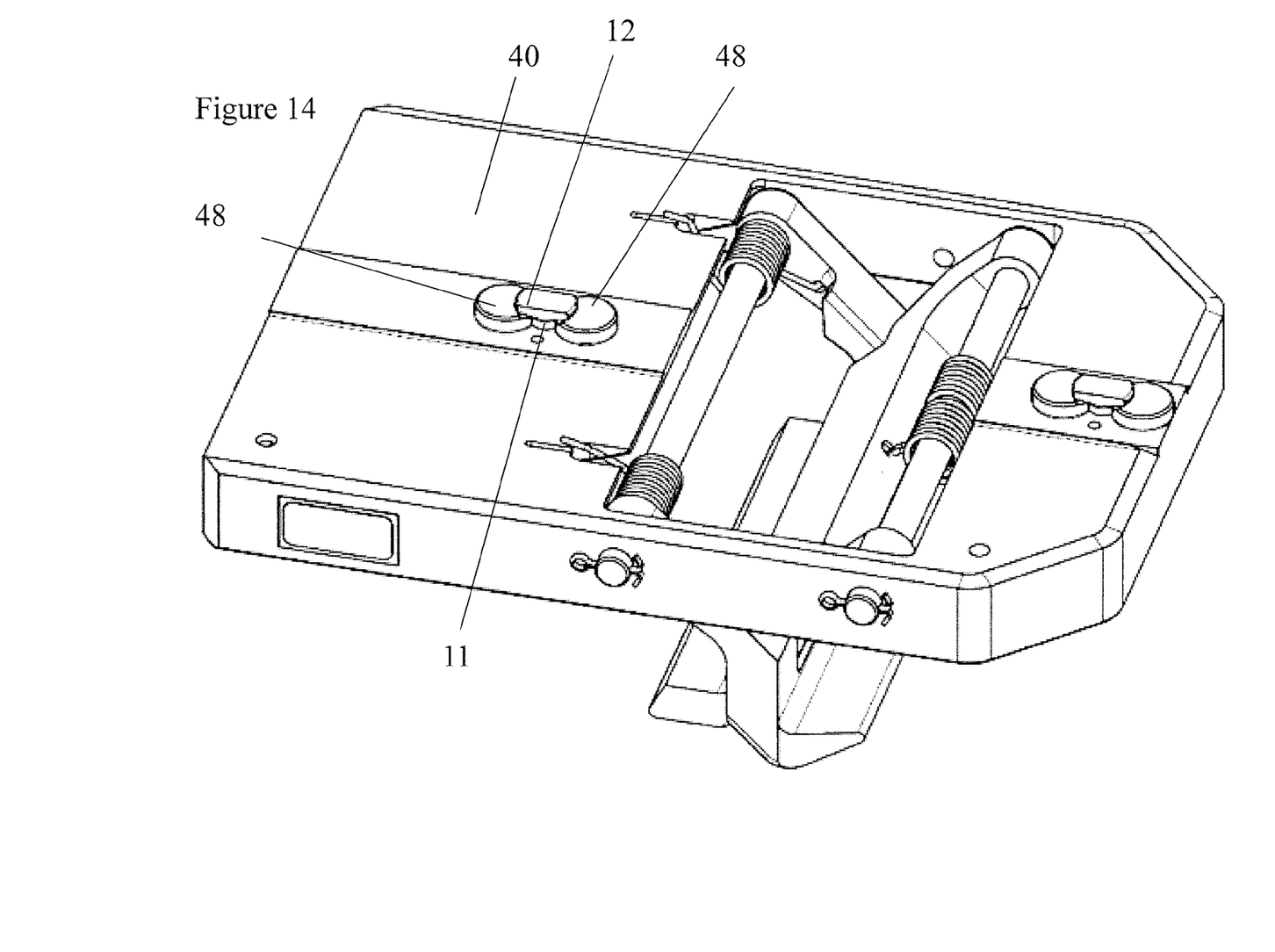
FIG. 14 is the view of FIG. 13 with the quick release devices in the releasing position.

In one embodiment, the cargo equipment base 40 may include one or more projections 48 that fit within the node segment 4 of the slotted track 1 (when the cargo equipment base 40 is disposed upon the track 1) to provide horizontal support to the cargo equipment base 40. In some embodiments as shown in FIGS. 13-14, the projections 48 may be cylindrical or in another shape to fit within the nodes 4 upon the track and provide horizontal support (in both perpendicular horizontal directions) upon the track 1.

In use, one or more quick release devices 10 mounted to a cargo equipment base 40 may be operated to fix or release the cargo equipment base 40 from the slotted track 1. Normally prior to installing the cargo equipment base 40 in a vehicle, the quick release device 10 would be connected to the cargo equipment base 40 or other suitable structures on cargo support equipment. In this connection it should be noted that in normal practice a plurality of quick release devices 10 would be used in a connection with cargo handling system equipment. The locking head portion 12 of the quick release device 10 is moved into a lug segment 5 of the slotted track 1 where the operator 21 can be rotated so that the stud 11 rotates and the locking head portion 12 engages the lug segment 5. If repositioning or release is desired, the operator 21 can be rotated back to the unlocked position so that the stud 11 rotates and the locking head portion 12 disengages the lug segment 5.

While the preferred embodiments of the disclosure have been described, it should be understood that the disclosure is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A quick release device for securing a cargo equipment base to a fixed track having regularly spaced-apart, enlarged openings along the length thereof (defining a plurality of node segments) separated by relatively narrower segments (defining a plurality of lug segments), the quick release device comprising:
   a stud having a locking head portion and a neck portion,
      the locking head portion being sized to fit in one of the plurality of lug segments,
      the locking head portion being configured to be received below the one of the plurality of lug segments,
      the stud having a rotatable body that is pivotable between a locking position in which the locking head portion can lockingly engage the one of the plurality of lug segments and a releasing position in which the locking head portion is out of locking engagement with the one of the plurality of lug segments whereby the stud no longer restrains relative movement between the cargo equipment base and the fixed track; and
   an outer retainer having a center hole for receiving the neck portion of the stud and a center portion of an inner retainer,
      the outer retainer having a blind hole that receives a detent that is biased radially inward towards the center hole,
      the outer retainer having an arcuate track that communicates with a tab from the inner retainer, with the arc length of the arcuate track defining the possible relative rotation of the inner retainer and stud with respect to the outer retainer; and
   the inner retainer comprises a shroud that defines the center hole, the shroud receives the neck portion of the stud, the inner retainer is pivotable with respect to the outer retainer wherein the inner retainer urges rotation of the stud from the locking position to the releasing position;
   wherein the inner retainer further comprises a plurality of recesses in the shroud that sequentially receive the detent of the outer retainer.

2. The quick release device of claim 1 wherein the locking head of the stud is generally "T"-shaped.

3. The quick release device of claim 1 wherein the inner retainer and the stud, when assembled, rotate in unison.

4. The quick release device of claim 1 wherein the outer retainer includes a visual locking indicator.

5. The quick release device of claim 4 wherein the visual locking indicator comprises a marking that is exposed when the stud is in the releasing position and is covered when the stud is in the locking position.

6. The quick release device of claim 1 wherein the arc length of the arcuate track is about 90 degrees.

7. The quick release device of claim 1 wherein the stud and inner retainer cannot rotate past the locking position or the releasing position.

8. The quick release device of claim 1 wherein the neck portion has a plurality of flats disposed thereon that engage corresponding flats on the shroud of the inner retainer.

9. The quick release device of claim 1 wherein the inner retainer can be rotated without the use of tools.

10. The quick release device of claim 1 further comprising a locking member that engages the neck portion of the stud to fix the stud to the cargo equipment base.

11. The quick release device of claim 1 wherein the outer retainer has a spring disposed within the blind hole that biases the detent radially inward.

12. The quick release device of claim 1 wherein the blind hole is defined through an inner surface of the outer retainer that defines the center hole.

13. The quick release device of claim 1 wherein the cargo equipment base includes one or more projections that fit within one or more of the plurality of node segments of the fixed track to provide horizontal support to the cargo equipment base when the cargo equipment base is disposed upon the fixed track.

14. The quick release device of claim 1 wherein the detent is received within one of the plurality of recesses upon the inner retainer when the tab engages a first end of the arcuate track.

15. The quick release device of claim 14 wherein the detent is received within another one of the plurality of recesses upon the inner retainer when the tab engages an end of the arcuate track opposite from the first end.

* * * * *